J. W. LAWHEAD.
CONNECTING DEVICE.
APPLICATION FILED MAY 28, 1910.

985,608.

Patented Feb. 28, 1911.

Witnesses
E. B. Maurer
A. L. Phelps

Inventor
James W. Lawhead

By C. C. Shepherd
Attorney

UNITED STATES PATENT OFFICE.

JAMES W. LAWHEAD, OF WILMINGTON, OHIO.

CONNECTING DEVICE.

985,608.　　　　Specification of Letters Patent.　　Patented Feb. 28, 1911.

Application filed May 28, 1910. Serial No. 564,004.

*To all whom it may concern:*

Be it known that I, JAMES W. LAWHEAD, a citizen of the United States, residing at Wilmington, in the county of Clinton and State of Ohio, have invented certain new and useful Improvements in Connecting Devices, of which the following is a specification.

My invention relates to the improvement of connecting devices and though as will be obvious, it is particularly adapted for connecting harness strap ends or as a coupling for horse collars, it is evident that it may be adapted for many purposes where two members are adapted to be connected one with the other.

The objects of my invention are to provide a simple, inexpensive and positive connecting device of improved construction, by means of which two separated parts or members may be readily connected or disconnected; to so construct my improved connecting device as to admit of an adjustable connection, whereby the distance between the connected parts may be regulated and to otherwise produce a strong, durable and effective connection which may be readily and easily operated. These objects I accomplish in the manner illustrated in the accompanying drawing, in which—

Figure 1:
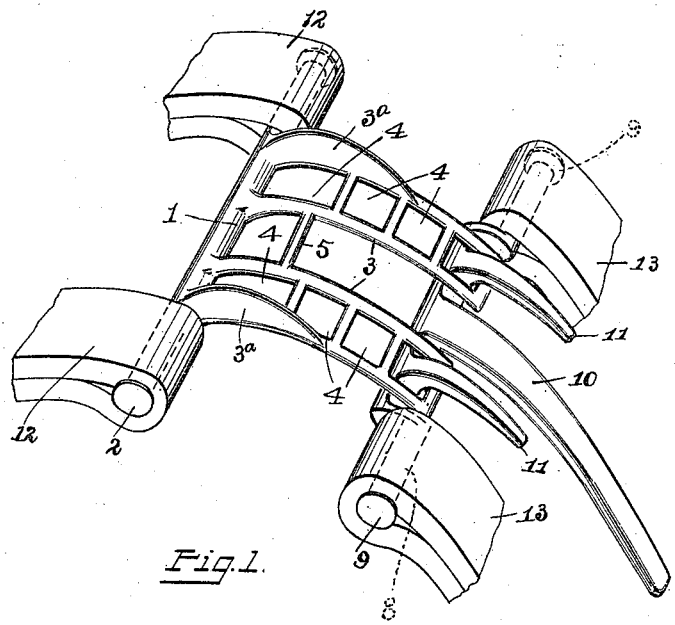
Figure 2:
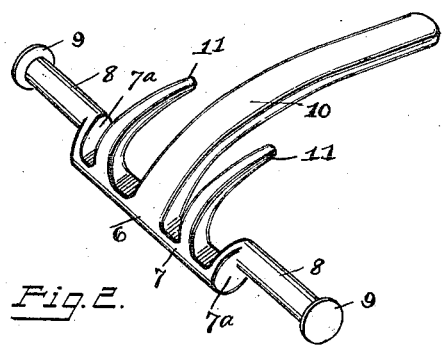

Figure 1 is a view in perspective showing the two members of my device connected one with the other in their locking positions, and Fig. 2 is a detail view in perspective of one of the connecting members.

Similar numerals refer to similar parts throughout the several views.

In carrying out my invention, I employ two separately formed connecting members, one of said members, which is indicated at 1, comprising a straight rod or bar body 1, which is preferably formed with enlarged or flanged ends 2. Formed with the rod or bar 1 on opposite sides of the center of the length thereof, are two parallel outwardly extending and correspondingly curved arms 3, each arm having a succession or plurality of openings therein as indicated at 4. These open-work arms are preferably braced in connection with each other by a short transverse arm 5 which connects the inner sides of said arms. In forming the outer and rear portions of each of the arms 3, I provide the same with upwardly extending flanges 3ª. The remaining coupling member or section which is indicated at 6, comprises a straight body portion 7 having end enlargements 7ª which project on one side of said body and from which extend eccentrically in the direction of the length of the body 7, opposing terminal pins 8, the latter having enlarged heads or end flanges 9. From the body 7 at a point midway between the enlargements 7ª, extends outwardly a slightly curved lever arm 10 and between the base of this lever arm and each of the enlargements 7ª, is provided an upwardly and forwardly curved tapering finger or hook member 11, the outer portions of said fingers extending in the general direction of the lever 10, but being of less length than the latter.

As indicated in the drawing, those portions of the rod or bar body 1 which extend beyond the sides of the arms 3 and the outwardly extending members 8 of the body 7 are designed to have connected therewith, straps or other members to be connected such as are indicated at 12 and 13.

In effecting a connection of the two connecting members 1 and 6, it will be understood that the hook fingers 11, are brought into engagement with corresponding openings 4 of the arms 3, said fingers being passed upwardly through the lower sides of said openings and the inner portion of the lever 10 extending within the bifurcation or space between the arms 3. When the parts are thus engaged, it will be observed that the parallel side members of the arms 3, will lie in the recessses which exist in the body 6 on opposite sides of the bases of the fingers 11. When the fingers of the members 6 are thus hooked into engagement with the openings 4 of the member 1 and the lever 10 swung forwardly in the general direction of the lengths of the arms 3, it is obvious that the connecting members will be locked together in such manner as to resist any tendency of the parts to separate as a result of pull or tension on the two connecting members in opposite directions.

In case the connecting device herein described, is adapted for use in connection with a horse collar or similar device, the projecting flanges 3ª will serve as lateral retainers for the usual hame straps which pass over the connection. It will also be readily seen that the connection may be shortened or lengthened by the engagement of the tongues or fingers 11 with different openings 4 of the arms 3, thus providing for a desirable adjustment of the connected parts.

It will be observed that the two connecting members formed as described, may be readily and easily engaged one with the other and that when thus engaged, said members are positively locked against accidental separation.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a device of the character described, the combination with a connecting member having means for attaching a strap or other body thereto and comprising a body portion having parallel arms projecting therefrom, each arm formed with a succession of openings, of a second connecting member comprising a body portion having means for attaching a strap or similar device thereto, said body having an offset portion between its ends, from which offset portion project parallel hook tongues and an intermediate lever arm.

2. In a device of the character described, the combination with a connecting member comprising a rod or bar body having parallel arms projecting therefrom at points distanced from the ends of said body, each of said arms having one or more openings therein, of a second connecting member comprising a rod or bar body having an offset intermediate its ends, and a pair of hook tongues and an intermediate lever arm projecting from said offset portion.

3. In a connecting device, the combination with a connecting member comprising a bar or rod body, parallel open-work arms extending therefrom and upright flanges on said arms, of a second connecting member comprising a rod or bar body having an offset intermediate portion and hook fingers, and a lever bar projecting from said offset portion between said hook fingers.

In testimony whereof I affix my signature in presence of two witnesses.

JAMES W. LAWHEAD.

Witnesses:
A. L. PHELPS,
INGLE A. MORRIS.

---

Copies of this patent may be obtained for five cents each, by addressing the "Commissioner of Patents, Washington, D. C."